June 20, 1950   A. H. J. DE LASSAUS ST. GENIES   2,512,242
RADIOGRAPHIC PROCESS
Filed July 24, 1947
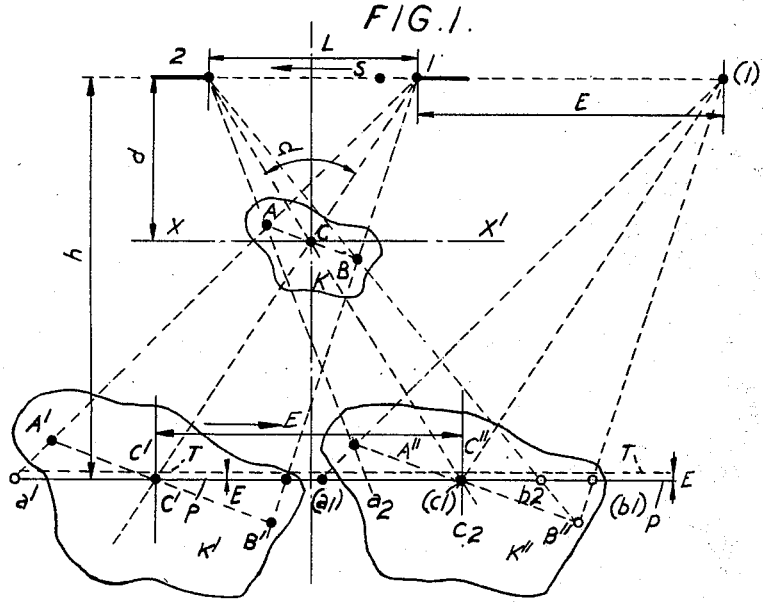
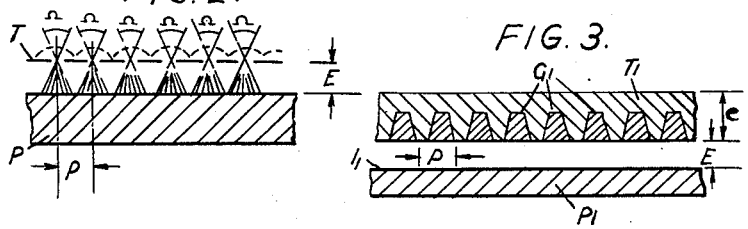
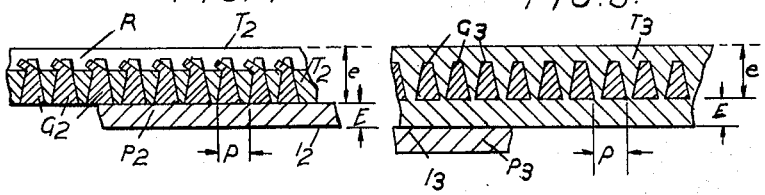
Anne Henri Jacques
de Lassus Saint Genies   Inventor.
By Stone, Boyden & Mack
                    Attorneys.

UNITED STATES PATENT OFFICE 2,512,242

RADIOGRAPHIC PROCESS

Anne H. Jacques de Lassus St. Geniés,
Versailles, France

Application July 24, 1947, Serial No. 763,210
In France September 11, 1944

Section 1, Public Law 690, August 8, 1946
Patent expires September 11, 1964

2 Claims. (Cl. 250—65)

In radiography it is known to make radiographic sections by displacing the radiogenic source and the radiographic plate during the time of the exposure by parallel movements in opposite directions relatively to the subject being radiographed, such that the respective amplitudes of these displacements are in the same ratio to one another as are the respective distances of the source and the sensitive plate from the plane containing the section required.

It is also known in photography to record a photograph in relief of any three-dimensional object with changing aspect of the object accompanying change of the observer's viewpoint, by the analogous action in a photographic apparatus of parallel displacements in suitable directions relatively to the object, of the objective on the one hand, and of an assembly or system formed by a lined screen (or a cylindrically lenticulated refracting screen) with the sensitive plate, on the other hand (see French Patent No. 752,064).

Among the objects of this invention are to provide radiographic negatives which present a radiographic section of any radiographed subject and at the same time are capable, when desired, of exhibiting such subject in correct relief and also its changing aspect with the change in viewpoint of the observer; to provide methods and means for recording and viewing such radiographic negatives and copies thereof; to provide methods and means for recording multiple radiographic sections and multiple radiographs on the same negative, and for viewing these by one or more observers at a time; to provide novel screen devices for recording purposes, and other objects and advantages of the invention as will become evident in the ensuing description and accompanying drawing.

In the accompanying drawing:

Fig. 1 schematically illustrates the recording process.

Fig. 2 is a schematic detail in section on an enlarged scale of the elementary chambers produced by the lined screen or by the translucent lenticular screen on the emulsion of the original negative, or on the gelatino-silver layer of copies thereof.

Figs. 3, 4 and 5 diagrammatically represent in section on an enlarged scale some particular constructional forms of the lined screen, or grid, for recording the original negatives or films, according to the conditions of use.

In Fig. 1, L represents the displacement of the radiogenic pin-point source S, K represents the stationary subject to be radiographed, XX' indicates the plane of the radiographic section (perpendicular to the plane of the drawing) to be produced, and T, P represents the movable assembly or system comprising the lined screen (or grid) T and the sensitive emulsion support P, which undergoes the displacement represented by E.

If $h$ and $d$ are the respective distances of the line 1, 2 of displacement L of the source S from the plane of displacement E of the system T, P and from the plane XX' of the radiographic section to be produced, there exist three simple relations characteristic of the process between the magnitudes E, L, $h$ and $d$;

First:

$$\frac{L}{E} = \frac{d}{h-d}$$

which expresses the ratio of the parallel displacements in opposite directions of the sources and of the emulsion support P provided with its grid T, in order to obtain the section on the plane XX';

Second:

$$\frac{p}{\epsilon} = \frac{L+E}{h} = 2 \tan \frac{\Omega}{2}$$

which expresses the maximum angle $\Omega$ swept by the rays from S in the contiguous elementary chambers of a depth $\epsilon$ provided between the grid T of pitch $p$ and the emulsion surface;

Third, deduced from the first:

$$\frac{d}{h} = \frac{L}{L+E}$$

which expresses the homothetic relation existing between the dimensions of the subject K and those of the spatial image K' or K'' of the subject observable in its three dimensions on the developed negative (or on any copy made by contact from such negative) when provided with a viewing screen or grid of the same pitch $p$ as the recording grid T.

With the grid T of pitch $p$ at a given distance $\epsilon$ from the emulsion surface I (Fig. 2) of the negative P, it can be shown that, for each point such as A, B, C belonging to the subject K, there will be recorded on the emulsion I by the sweeping of the pencils through the angle $\Omega$, areas of unequal extent such as ($a_1$) $a_2$, ($b_1$) $b_2$, ($c_1$) $c_2$, composed of point images regularly spaced at intervals greater or smaller than the pitch of the grid T, according as to whether the points belonging to the subject are situated nearer to (such as A) or farther from (such as B) the line 1, 2 of displacement of the projection point S, than the section plane XX'. For any point C such as which is situated in this section plane, a single point trace is recorded on the emulsion I.

These are the recording conditions which make it possible, with the aid of a viewing lined screen or lenticular screen of the same pitch $p$ as the recording grid and of the same orientation and at the same separation $\epsilon$ relatively to the lined image on the developed original negative (or on contact copies made therefrom), to examine the image K″ (Fig. 1) of the subject K in relief with the change of aspect accompanying the change of the observer's viewpoint, moving, for instance, along the whole base LE comprised between the points 1 and 2 relatively to the negative. If a lenticular screen is used for viewing (as indicated in dotted lines in Fig. 2), $\epsilon$ denotes the focal length of its elementary plano-convex lenses.

However, as in radiography the subject K is necessarily placed between the point projection source S and the emulsion surface I during recording, whereas in photography when recording a photograph in relief it is the projection point (namely, the emergent nodal point of the objective) which is placed between the subject and the emulsion surface, it will be appreciated that in the present case the original radiographic negative can only be viewed, and seen in relief, in the same sense as the subject when the negative is fitted with a lined screen or lenticular screen, gelatinised layer towards the screen, exactly as the original negative was arranged during the recording.

In order to be able to view copies made by contact from this negative without inversion of the sense of the subject, for instance lateral inversion to the right or left, so that the correct relief and not the pseudoscopic relief is visible to the observer if he views these copies through their viewing screens, it is necessary to turn each copy over before fitting it with its screen, if the thickness of the emulsion support permits, that is to say, if this thickness is of the order of $\epsilon$. It will readily be appreciated that a variation of $\epsilon$ produces a proportional variation in the same sense as $\epsilon$ of the scale of the spatial construction presented to view.

The influence of the thickness of the copies is, therefore, not appreciable if they are on film, owing to the slight thickness of the support. Any difficulty in this respect disappears altogether if the original is recorded with the support side, and not the emulsion side, against the recording grid, the spacing $\epsilon$ which defines $\Omega$ as a function of $p$ being in this case, as in the previous arrangement, the spacing between the emulsion surface and the recording grid during recording.

The more or less great permeability of a large number of materials to the rays emitted by the radiogenic source requires, for ensuring proper recording, that the recording grid should consist of a material which, with sufficient thickness, is opaque to these rays. Accordingly, I provide a recording grid as exemplified by the embodiments of Figs. 3, 4 and 5, which consists of a plate such as $T_1$, $T_2$ or $T_3$ made of a substance translucent to the rays emitted by the source, and having inlaid bars such as $G_1$, $G_2$ or $G_3$ made of a substance such as lead. These bars may be of triangular section or slightly truncated and trapezoidal as shown, so as to present a maximum thickness in the direction of propagation of the rays. If, for example, the angle $\Omega$ as defined by the second of the characteristic relations above noted lies between 20° and 30°, the ratio of the height of the bars to their base (of a width approaching the pitch $p$ of the grid) is of the order of 2. If, for example, the pitch of the grid is of millimetre order (e. g., 12 to 16 bars to the centimetre), which is quite permissible for radiographic negatives having dimensions 18 x 24 cm. at least, radiographic negatives being always of lower definition than photographic negatives, the height of the bars will be sufficient to present an effective opacity to the rays reaching the emulsion after passing through the subject to be radiographed.

Illustratively, Fig. 3 shows a grid of this kind spaced at a distance $\epsilon$ from the emulsion surface $I_1$ of an unexposed negative $P_1$, the wider base of the opaque bars $G_1$ being flush with the face of the grid plate $T_1$ which faces the emulsion layer $I_1$. In this embodiment, the grid plate $T_1$ is supported in the requisite spaced relation by any suitable means (not shown), such as a frame of calibrated thickness.

In the arrangement shown in Fig. 4, the spacing $\epsilon$ is provided by the thickness of the negative $P_2$ itself, which is interposed between the grid plate $T_2$ and the emulsion layer $I_2$ so that the latter is underneath.

In Fig. 5 the grid plate $I_3$ faces the emulsion side $I_3$ of the negative $P_3$ and the spacing is provided in this case by an extra thickness of the material of the plate $T_3$ itself which covers the wider base of the bars $G_3$ and is interposed between them and the emulsion layer $I_3$.

In the embodiments of Figs. 3 and 4, recesses or grooves in the grid plate $T_1$ or $T_2$ for accommodating the inlaid bars $G_1$ or $G_2$ may be produced with a machine tool of the engraving or planing type in one or more operations, or these grooves may be cast or moulded if the material of the plate can be cast or moulded, for instance, under pressure. The bars themselves are preferably drawn to the desired profile.

Fig. 4 also shows a method of fixing the bars in the grid plate by providing narrow grooves R, pitched for example about a centimetre apart in the thickness of the plate $T_2$ on its dorsal side, namely the side of the narrower base of the bars $G_2$, the grooves R being disposed transversely to the grooves which receive the bars $G_2$ and being sufficiently deep so that the bar grooves slightly penetrate the grooves R, whereby when the bars $G_2$ are positioned in their grooves, portions of the narrower base of the bars lie exposed in the grooves R. After the bars $G_2$ have thus been inserted into their grooves, the plate $T_2$ is rested on a slab with the grooves R uppermost and a suitable tool such as a small wheel is passed along the grooves R so as to roll or otherwise slightly deform the exposed portions of the bars out of line sufficiently to thereby lock the bars to the plate. The direction of travel of the tool from one groove R to the next may be reversed in order to ensure firm attachment of the bars.

Another method would be to cast the material of the bars in the material of the plate, or conversely the material constitutes the plate around the bars mounted on a temporary frame, if the melting points of the two materials permit. A grid of the character shown in Fig. 5 may be made in this way.

Lined screens, used for viewing the negatives or copies thereof are simple photographic screens made by contact from an original screen of the same pitch as the recording grid. This original screen may be made by copying by contact from the recording grid itself (using a radiogenic source of illumination) on to a photographic plate of strong contrast (for photogravure).

As is known, viewing screens may be appreciably less opaque than the recording grids, without affecting view-point selection by each eye when viewing the negatives in relief. Thereby the luminosity of the viewed image is greatly enhanced.

As is also known, viewing under conditions of the highest luminosity is achieved by using, instead of lined screens, screens made of a translucent material of suitable index which are cylindrically lenticulated or fluted by machining according to a suitable profile, the parallel axes of the diopters being of the same pitch as the bars of the recording grids.

During recording, and for satisfactory viewing, it is necessary that the spacing $\epsilon$ between the rear side of the grid or lined screen and the emulsion surface should be rigorously fixed and maintained. According to which of the above-suggested mountings (Figs. 3 to 5) is adopted for the grid and emulsion support, and according to the nature of the support itself, this spacing may be assured by clamping either the edges only, or the whole area, of the surfaces of the emulsion support and grid which face each other.

When the subject to be radiographed is thin, like a hand for instance, it may be placed in contact with a holder carrying the system T. P. The subject and the holder are then kept stationary, whilst the radiogenic source alone is displaced along a base equal to $L+E$, to ensure covering the elementary chambers under the angle $\Omega$ defined by $p$ and $\epsilon$. The spatial construction obtained is superposed on the subject itself.

Any negative correctly recorded can be viewed in relief by viewing with the line joining the eyes placed transversely to the lines of the viewing screen (lined screen or lenticular screen). On the contrary, for viewing the distinct aspects of the radiographed subject as successively seen from the source moving along its base L, the line of the eyes must be parallel with the lines of the negative fitted with the lined or lenticular viewing screen, and the negative caused to move by translation in its plane perpendicularly to the direction of the lines, or caused to oscillate through an angle $\Omega$ in both directions around an axis parallel with the lines and the line joining the eyes, as is the practice for viewing the relative changes of aspect and sliding of the frontal planes of any subject photographed in relief.

It is possible to obtain photographs in relief identical with one another either by displacing the system T, P relatively to the projection point S, the two constituents T and P being fixedly spaced by $\epsilon$, or by placing these two constituents in close contact ($\epsilon=0$) and causing the grid T to slide transversely to its lines with a uniform movement on the surface of the emulsion of the support P during its unchanged displacement, the sliding of the grid being substantially equal to the width of one of the opaque bars of the grid during the period of total displacement of the projection point S. The direction in which the grid T slides on the emulsion support P is important, in order to obtain the correct relief and not a pseudoscopic relief.

A similar procedure may be adopted to obtain a radiograph in relief. Correct viewing of the developed or copied image takes place with a lined or lenticular viewing screen of pitch $p'$ which is slightly smaller than the pitch $p$ of the recording grid, in the ratio $$\frac{p'}{p}=\frac{h-\epsilon}{h}$$

if $h$ is the optimum viewing distance, $\epsilon$ being the spacing adopted in the viewing holder between the lined viewing screen (or in the case of a lenticular viewing screen, the plane containing the optical centres of the diopters of the screen) and the plane of the radiographic image. From the relations existing between L, E and $p$ is deduced the value of $\epsilon$ which gives a satisfactory spatial scale of the aerial construction in relief. This method also suggests a viewing method which is a corollary thereof, according to which a lined or lenticular screen of the same pitch $p$ as the recording grid is made to slide in contact with the radiographic negative or copy therefrom in order to catch the successive aspects of the radiographed subject, without imparting any other movement to the negative itself and without the stationary observer or observers being obliged to fix their eyes on a line parallel with the lines of the screen.

By a recording method in which the recording grid and the emulsion support are mounted in contact ($\epsilon=0$), it is possible to obtain $n+1$ distinct high definition radiological sections of the same subject, provided the recording grid in contact with the emulsion occupies $n+1$ successive fixed positions (the opacity of the grid being measured by $$\frac{n}{n+1}$$

where $n$ is an integer), and the amount of displacement of the grid transversely to its lines, from one record to the next, being equal to $$\frac{p}{n+1}$$

At each recording, the source and the system T, P are given movements in opposite directions L and E, the amplitudes of which are preferably greater than in the different cases of recording in relief, since it is no longer necessary to sweep through an angle of at most $\Omega$. However, said amplitudes remain in the ratio $$\frac{d}{h-d}$$

defined each time by the position of the section plane XX' on the subject K. These successive sections are viewed by one of the methods above described; either one in which the lined or lenticular viewing screen, of suitable pitch $p'$ is mounted at the spacing $\epsilon$ from the radiograph required by the size of $p'$, whilst the observer's eyes are parallel with the lines of the negative thus mounted and the system is displaced relatively to the observer, or one in which the viewing screen of pitch $p$ is free to slide by exactly its pitch $p$ in contact with the radiograph, and the observer or observers remain stationary relatively to the negative in the viewing positions, which are immaterial.

This invention also embraces the recording on the same negative of multiple radiographs of a subject, for instance in the course of its natural deformations (such as a human heart or a stomach), by keeping the radiogenic source and the plate or film carrying holder stationary during recording, the recording grid alone being moved in contact with the emulsion by the small displacement transversely to its lines which has been discussed above. The result is observed by one of the methods described for viewing n+1 radiographic sections.

I claim:
1. A radiographic process for recording multiple radiographs on the same negative of a stationary subject, comprising the steps of arranging the subject between a point radiogenic source and a photographically sensitised recording surface, arranging in close contact with said surface and between it and the subject a grid having portions translucent to and linear elements opaque to rays emitted from said source, exposing said recording surface to rays impinging thereon from said source after passage through the subject and said grid, and during such exposure maintaining said source and said surface stationary and moving said grid in its plane transversely to its linear elements by a displacement equal to the width of one of said elements.

2. A process for producing a radiograph capable of presenting different aspects of a radiographed section of a thin stationary subject whereby an impression of relief is obtained, comprising the steps of arranging the subject between a point source of X-rays and a photographically sensitised recording surface and in contact with one side of a grid having parallel equally spaced linear elements opaque to X-rays alternating with portions transparent to X-rays, the other side of the grid being near said recording surface and the subject being sufficiently thin and the distance of the subject in contact with the grid being such that the section of the subject to be radiographed is arranged at substantially the same distance as said grid from said source, and exposing said recording surface to the X-ray beam from said source passing through said subject and said transparent portions of said grid, while maintaining said subject, grid and recording surface stationary and translating said source transversely with respect to said opaque elements to cause contiguous elementary areas of said recording surface, each of width equal to the pitch of said opaque elements and of length equal to the length of said opaque elements, to be traversed simultaneously by the X-ray beam traversing said transparent portions of said grid.

A. H. JACQUES DE LASSUS ST. GENIÉS.

REFERENCES CITED

The following references are of record in the file of this patent:

UNITED STATES PATENTS

| Number | Name | Date |
|---|---|---|
| 758,117 | Snook | Apr. 26, 1904 |
| 1,547,376 | Flarsheim et al. | July 28, 1925 |
| 1,566,130 | Tichy et al. | Dec. 15, 1925 |
| 1,904,867 | Kurtz | Apr. 18, 1933 |
| 2,029,300 | Arfsten | Feb. 4, 1936 |
| 2,150,932 | McDonnell | Mar. 21, 1939 |
| 2,318,983 | Winnek | May 11, 1943 |

FOREIGN PATENTS

| Number | Country | Date |
|---|---|---|
| 344,522 | France | Nov. 4, 1907 |
| 449,213 | Great Britain | June 23, 1936 |